(12) United States Patent
Tanaka et al.

(10) Patent No.: US 8,892,430 B2
(45) Date of Patent: Nov. 18, 2014

(54) NOISE DETECTING DEVICE AND NOISE DETECTING METHOD

(75) Inventors: Masakiyo Tanaka, Kawasaki (JP); Takeshi Otani, Kawasaki (JP); Shusaku Ito, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1151 days.

(21) Appl. No.: 12/428,216

(22) Filed: Apr. 22, 2009

(65) Prior Publication Data

US 2010/0030556 A1   Feb. 4, 2010

(30) Foreign Application Priority Data

Jul. 31, 2008 (JP) ................................. 2008-198536

(51) Int. Cl.
| | | |
|---|---|---|
| *G10L 21/00* | (2013.01) | |
| *G11B 20/24* | (2006.01) | |
| *G10L 21/0208* | (2013.01) | |
| *G10L 15/00* | (2013.01) | |
| *G06F 11/00* | (2006.01) | |
| *H03M 13/00* | (2006.01) | |
| *H04R 29/00* | (2006.01) | |
| *H04R 3/00* | (2006.01) | |
| *H04B 3/46* | (2006.01) | |
| *H04B 1/38* | (2006.01) | |
| *H04L 5/12* | (2006.01) | |
| *G11B 20/10* | (2006.01) | |

(52) U.S. Cl.
CPC .......... *G11B 20/24* (2013.01); *G11B 20/10527* (2013.01); *G10L 21/0208* (2013.01); *G11B 20/10009* (2013.01); *G11B 2020/10564* (2013.01)
USPC ........... 704/226; 375/346; 375/227; 375/219; 375/265; 375/373; 704/229; 704/201; 704/500; 704/230; 704/233; 714/814; 714/784; 381/56; 381/92

(58) Field of Classification Search
USPC ......... 704/225, 233, 226, 229, 201, 500, 230; 700/94; 375/285, 346, 227, 219, 373, 375/265; 381/92, 56; 714/817, 784
See application file for complete search history.

(56) References Cited

U.S. PATENT DOCUMENTS 5,488,704 A    1/1996 Fujimoto
5,983,176 A *  11/1999 Hoffert et al. ................. 704/233

(Continued)

FOREIGN PATENT DOCUMENTS

| JP | 8-37504 | 2/1996 |
|---|---|---|
| JP | 2000-278153 | 10/2000 |

(Continued)

OTHER PUBLICATIONS

S. V. Vaseghi et al., "Detection and Suppression of Impulsive Noise in Speech Communication Systems", IEE Proceedings I. Solid-State & Electron Devices, Institution of Electrical Engineers, Stevenage, GB, vol. 137, No. 1, Part 01, Feb. 2, 1990, pp. 38-46.

(Continued)

*Primary Examiner* — Paras D Shah
*Assistant Examiner* — Neeraj Sharma
(74) *Attorney, Agent, or Firm* — Staas & Halsey LLP

(57) ABSTRACT

A difference signal calculating unit of a noise detecting device calculates a difference between the amplitudes of a residual signal at each sample timing and a residual signal at the preceding sample timing. A difference signal comparing unit determines whether or not an impulsive noise is present on the basis of the difference signal at the current sample timing, and the difference signal at each sample timing within a predetermined duration from the current sample timing.

11 Claims, 17 Drawing Sheets

(56) References Cited

U.S. PATENT DOCUMENTS

| | | | |
|---|---|---|---|
| 6,226,608 B1* | 5/2001 | Fielder et al. | 704/229 |
| 6,647,070 B1* | 11/2003 | Shalvi et al. | 375/285 |
| 7,174,022 B1* | 2/2007 | Zhang et al. | 381/92 |
| 7,665,012 B2* | 2/2010 | Starr | 714/817 |
| 7,787,975 B2* | 8/2010 | Garcia | 700/94 |
| 8,638,809 B1* | 1/2014 | Goodson | 370/441 |
| 2002/0138258 A1* | 9/2002 | Knoblich et al. | 704/226 |
| 2004/0125236 A1* | 7/2004 | Kempf | 348/700 |
| 2005/0192800 A1* | 9/2005 | Thyssen | 704/230 |
| 2006/0067388 A1* | 3/2006 | Sedarat | 375/219 |
| 2007/0030931 A1* | 2/2007 | Arambepola | 375/346 |
| 2007/0183526 A1* | 8/2007 | Norrell et al. | 375/265 |
| 2007/0230649 A1* | 10/2007 | Yousef et al. | 375/373 |
| 2008/0065969 A1* | 3/2008 | Jain et al. | 714/784 |
| 2008/0075157 A1* | 3/2008 | Allen et al. | 375/227 |
| 2008/0292107 A1* | 11/2008 | Bizjak | 381/56 |
| 2009/0016471 A1* | 1/2009 | Rajagopal | 375/346 |
| 2009/0168929 A1* | 7/2009 | Liu et al. | 375/346 |
| 2009/0216489 A1* | 8/2009 | Mahadevan et al. | 702/181 |
| 2010/0332223 A1* | 12/2010 | Morii et al. | 704/225 |

FOREIGN PATENT DOCUMENTS

| | | |
|---|---|---|
| JP | 2004-20427 | 1/2004 |
| JP | 2006-178486 | 7/2006 |
| JP | 2007-266956 | 10/2007 |
| WO | 98/05031 | 2/1998 |

OTHER PUBLICATIONS

S.V. Vaseghi et al., "Restoration of Old Gramophone Recordings", Journal of the Audio Engineering Society, Audio Engineering Society, New York, Ny, US, vol. 40, No. 10, Oct. 1, 1992, pp. 791-801.

European Search Report mailed Jul. 6, 2009 and issued in corresponding European Patent Application 09158583.6.

Japanese Office Action issued Oct. 30, 2012 in corresponding Japanese Patent Application No. 2008-198536.

* cited by examiner

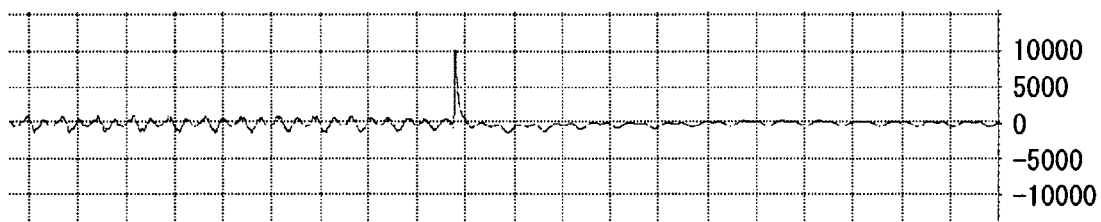
F I G. 1A
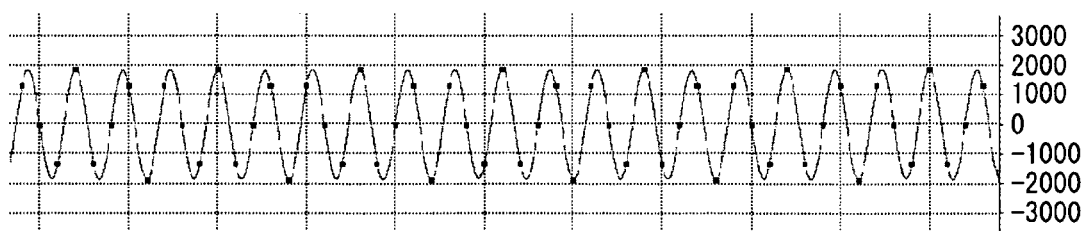
F I G. 1B

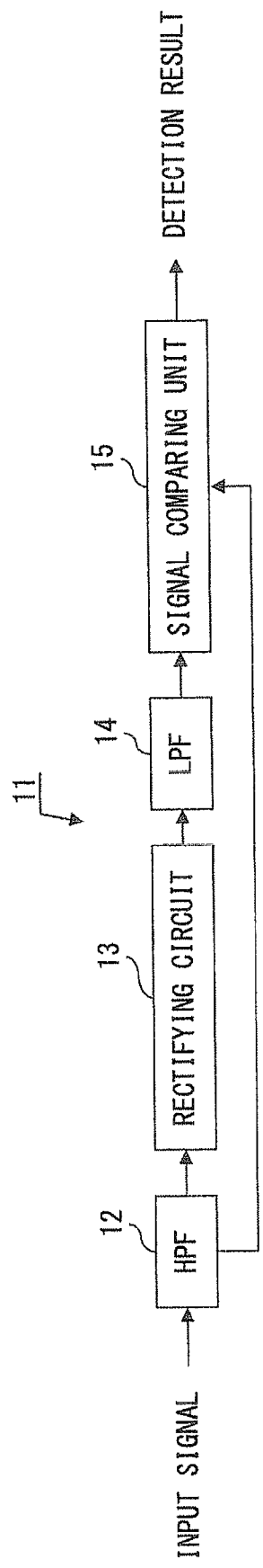
F I G. 3

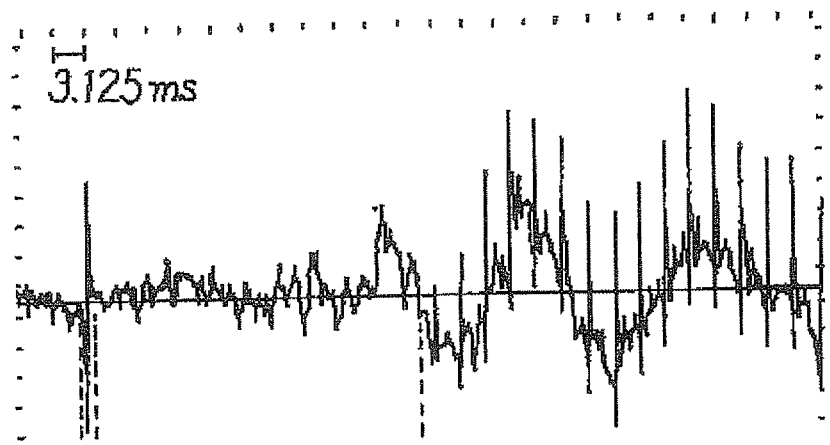
F I G. 4 A
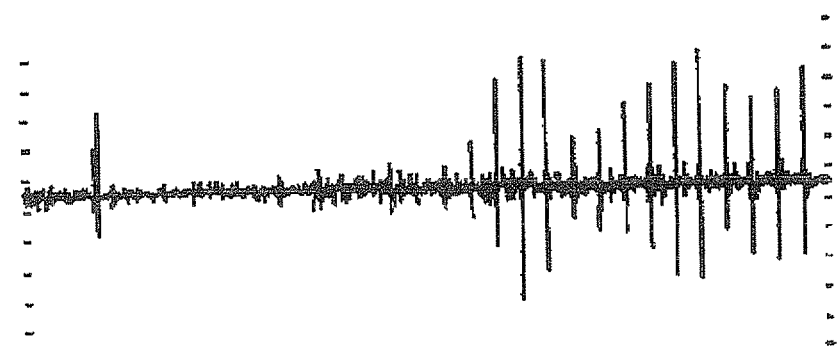
F I G. 4 B
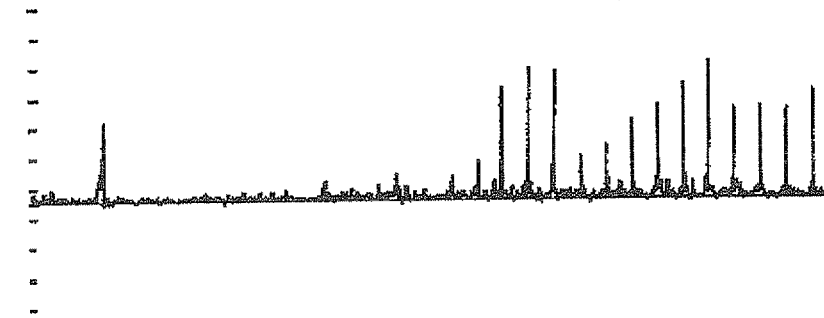
F I G. 4 C
F I G. 4 D

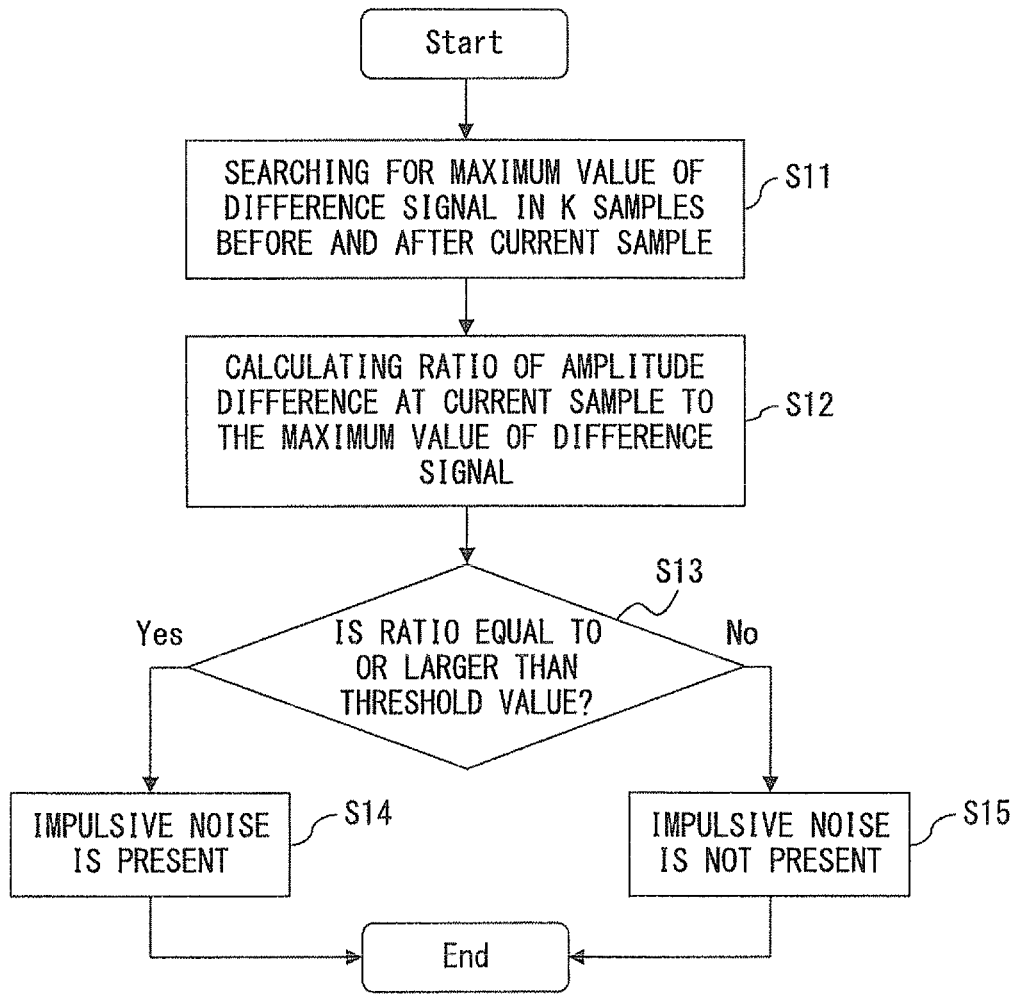
F I G. 9

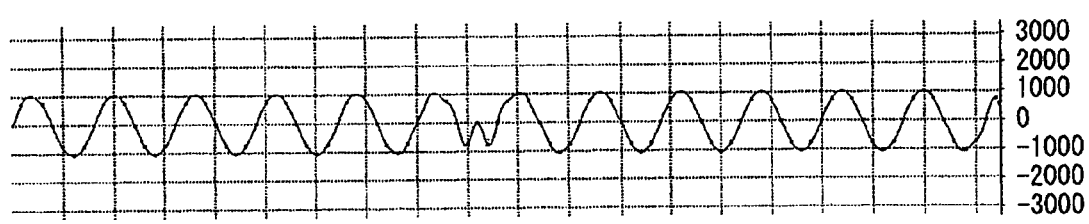
F I G. 1 0 A
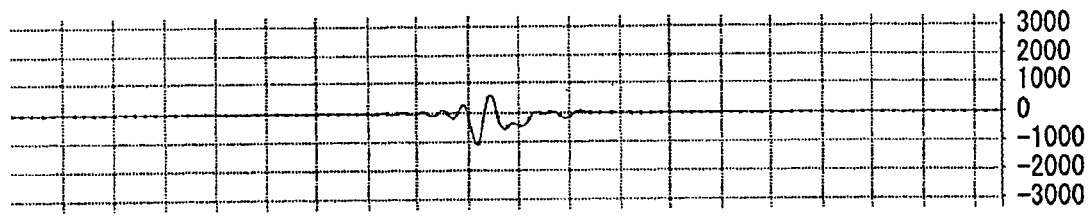
F I G. 1 0 B
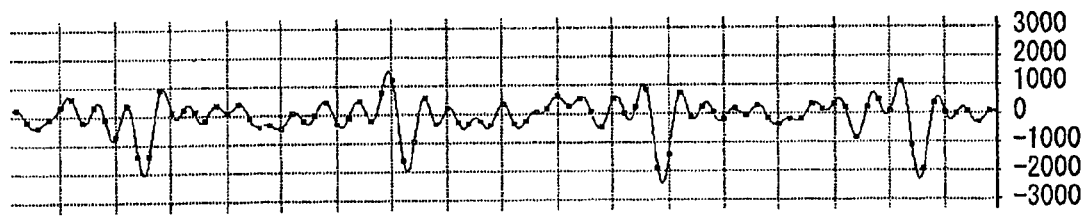
F I G. 1 0 C

AVERAGE VALUE $d_{av} = \sum_{n=-K}^{K} \dfrac{d_n}{2K+1}$  (1)

STANDARD DEVIATION $S = \sqrt{\dfrac{\sum_{n=-K}^{K}(d_n - d_{av})^2}{2K}}$  (2)

DEVIATION IN CASE OF n=0  $H_0 = \dfrac{d_0 - d_{av}}{S}$  (3)

F I G. 14

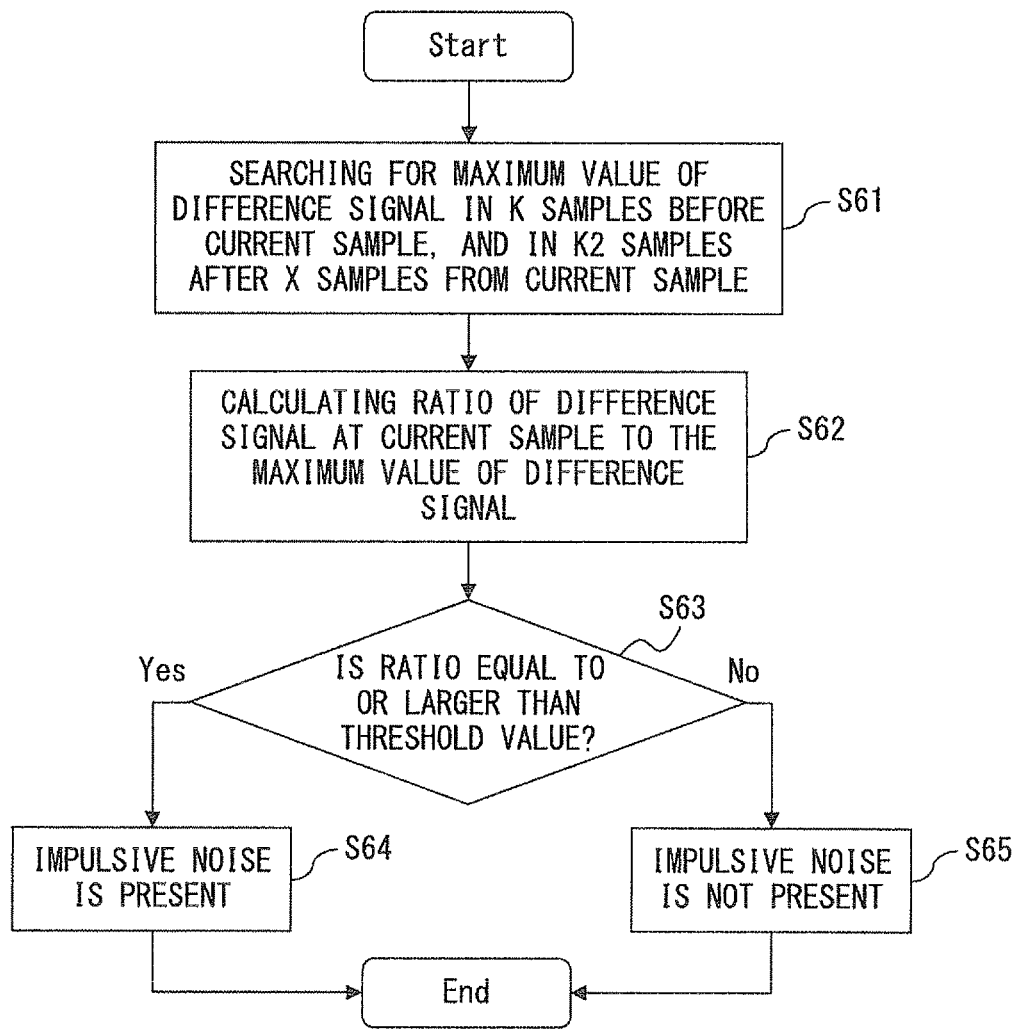
F I G. 17

NOISE DETECTING DEVICE AND NOISE DETECTING METHOD

CROSS-REFERENCE TO RELATED APPLICATIONS

This application is based upon and claims the benefit of priority of the prior Japanese Patent Application No. 2008-198536, filed on Jul. 31, 2008, the entire contents of which are incorporated herein by reference.

FIELD

The present invention relates to a device for detecting an impulsive noise in a digital voice communication, and a method thereof.

BACKGROUND

There has been a problem that an impulsive noise mixes due to a device fault, etc. at the time of A/D or D/A conversion in a voice communication network. In the Next Generation Network (NGN), a high communication quality is demanded, and it is necessary to detect and remove an impulsive noise.

The following two methods are known as techniques for detecting an impulsive noise.

(1) Detecting an impulsive noise by using the phenomenon that the amplitude or the amplitude fluctuation of a signal becomes large in a portion where an impulsive noise exists.
(2) Detecting an impulsive noise by using the phenomenon that the frequency characteristic of an impulsive noise differs from a voice signal.

According to Patent Document 1, an impulsive noise is detected by using the above described conventional detecting method (1). Namely, the absolute value of a difference between the amplitudes of adjacent PCM codes is measured, and a click noise is determined if the measured value is larger than a threshold value (paragraph 0007). The threshold value on the order of $1/16$ to $1/8$ (2000 to 4000 for 16-bit PCM) of the maximum allowable amplitude is used.

FIG. 1A illustrates an impulsive noise, whereas FIG. 1B illustrates a tone signal. If the threshold value of the difference between the maximum value of the amplitude of the impulsive noise and the amplitude of the signal is set to 2000 to 4000, the absolute value of the difference between the amplitudes of the impulsive noise and the signal becomes larger than the threshold value (2000 to 4000). Therefore, the impulsive noise can be detected.

However, for the 3-kHz tone signal, which is illustrated in FIG. 1B and the average power of which is on the order of −25 dBov, the amplitude difference becomes approximately 3000 at the maximum, and a normal signal can be possibly determined as an impulsive noise in an erroneous manner depending on a threshold value. Square dots illustrated in FIG. 1B represent sampling points.

FIGS. 2A, 2B and 2C respectively illustrate a 1-kHz tone signal, an impulsive noise, and the tone signal on which the impulsive noise is superimposed.

Assume that the maximum value of the amplitude of the 1-kHz tone signal illustrated in FIG. 2A is 1000, the peak value of the impulsive noise is 1000, and the impulsive noise occurs when the value of the tone signal is negative. In this case, the amplitude difference in the portion of the impulsive noise becomes equal to or smaller than the threshold value. Therefore, the impulsive noise cannot be detected with the conventional detecting method (1).

FIG. 3 is a block diagram of a conventional noise detecting circuit 11. FIGS. 4A to 4D illustrate the signal waveforms of the noise detecting circuit 11. The noise detecting circuit 11 detects an impulsive noise by using the above described conventional method (2).

A low-frequency component of an input signal is cut off by a highpass filter (HPF) 12. As a result, the high-frequency signal illustrated in FIG. 4B is extracted from the input signal which is illustrated in FIG. 4A and on which a high-frequency noise is superimposed.

A rectifying circuit 13 rectifies a high-frequency signal. With the rectifying circuit 13, only a positive component of the high-frequency signal, which is illustrated in FIG. 4C, is output.

A lowpass filter (LPF) 14 outputs an envelope signal of the output signal of the rectifying circuit 13. With the lowpass filter 14, the envelop signal illustrated in FIG. 4D can be obtained.

A signal comparing unit 15 makes a comparison between the high-frequency signal output from the highpass filter 12 and the envelope signal output from the lowpass filter 14, and determines an impulsive noise if the high-frequency signal is larger than the envelope signal by a predetermined value or more.

Patent Document 2 recites that a music signal similar to a pulsed noise is prevented from being erroneously determined as a noise by making a periodical determination with an autocorrelation function. Patent Document 2 also recites that the pulsed noise is replaced with a prediction signal generated with a linear prediction method.

However, the invention disclosed by Patent Document 2 targets an impulsive noise superimposed on a music signal when a record is reproduced, and assumes a high sampling frequency. For a signal of low sampling frequency (for example, 8-kHz sampling frequency) such as a voice communication, a noticeable signal power difference does not occur in the frequencies of an impulsive noise and a voice signal. Therefore, the impulsive noise cannot be detected with signal powers.

FIG. 5 illustrates the frequency characteristics of the impulsive noise and the voice signal. As illustrated in FIG. 5, differences between the signal powers of the impulsive noise and the voice signal are small in a 0 to 4-kHz band. Therefore, the impulsive noise cannot be detected with the signal powers.

[Patent Document 1] Japanese Patent No. 3183490
[Patent Document 2] Japanese Laid-open Patent Publication No. 2006-178486

SUMMARY

A disclosed noise detecting device is a noise detecting device for detecting an impulsive noise of a digital voice signal. This noise detecting device includes: a residual signal calculating unit for calculating a residual signal that is obtained by removing a prediction signal, which is acquired by performing a linear prediction for an input signal, from the input signal; a difference signal calculating unit for calculating a difference signal between a residual signal at the current sample timing and a residual signal at a timing before the current sample timing by a predetermined number of sample timings; and a determining unit for determining whether or not an impulsive noise is present on the basis of the amplitude of the difference signal at the current sample timing, and the amplitudes of difference signals at sample timings within a predetermined duration.

With this noise detecting device, an impulsive noise of a digital voice signal can be accurately detected.

The object and advantages of the invention will be realized and attained by means of the element and combinations particularly pointed out in the claims. It is to be understood that both the forgoing general description and the following detailed description are exemplary and explanatory and are not restrictive of the invention, as claimed.

BRIEF DESCRIPTION OF DRAWINGS

FIGS. 1A and 1B respectively illustrate an impulsive noise and a tone signal;

FIG. 3 is a block diagram of a conventional noise detecting circuit;

FIGS. 4A to 4D illustrate the signal waveforms of the noise detecting circuit;

FIG. 9 is a flowchart illustrating the operations of the first embodiment;

FIGS. 10A to 10C illustrate a tone signal on which an impulsive noise is superimposed, and a residual signal;

FIG. 14 illustrates the equations of a deviation;

FIG. 17 is a flowchart illustrating the operations of a sixth embodiment.

DESCRIPTION OF EMBODIMENTS

Figure 2A:
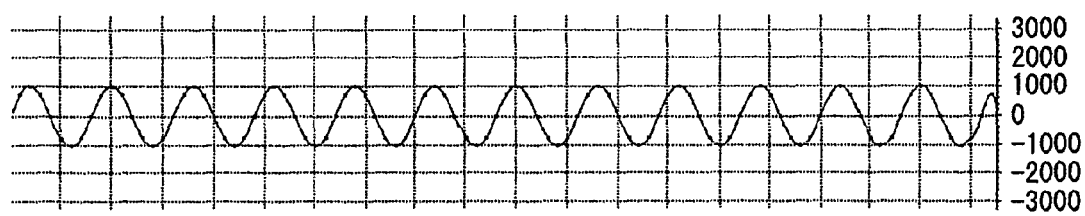
FIGS. 2A, 2B and 2C respectively illustrate a tone signal, an impulsive signal, and the tone signal on which the impulsive noise is superimposed.
Figure 2B:
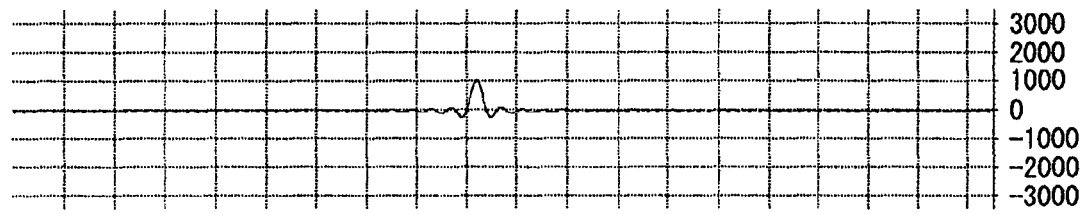
Figure 2C:
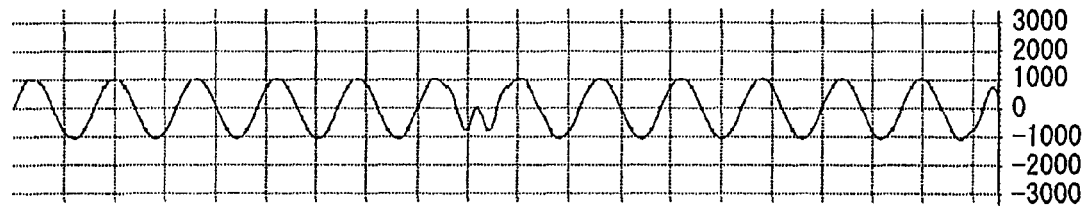
Figure 5:
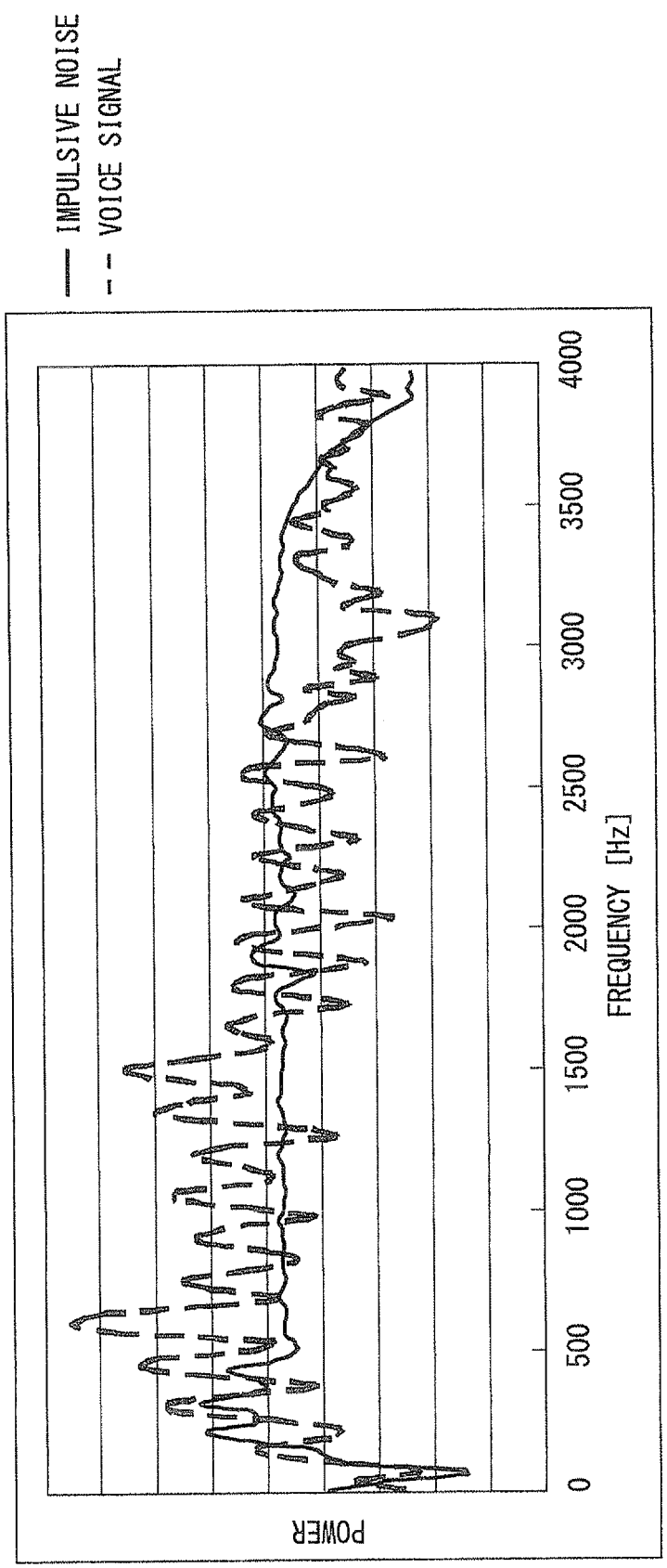
FIG. 5 illustrates the frequency characteristics of an impulsive noise and a voice signal.
Figure 6:
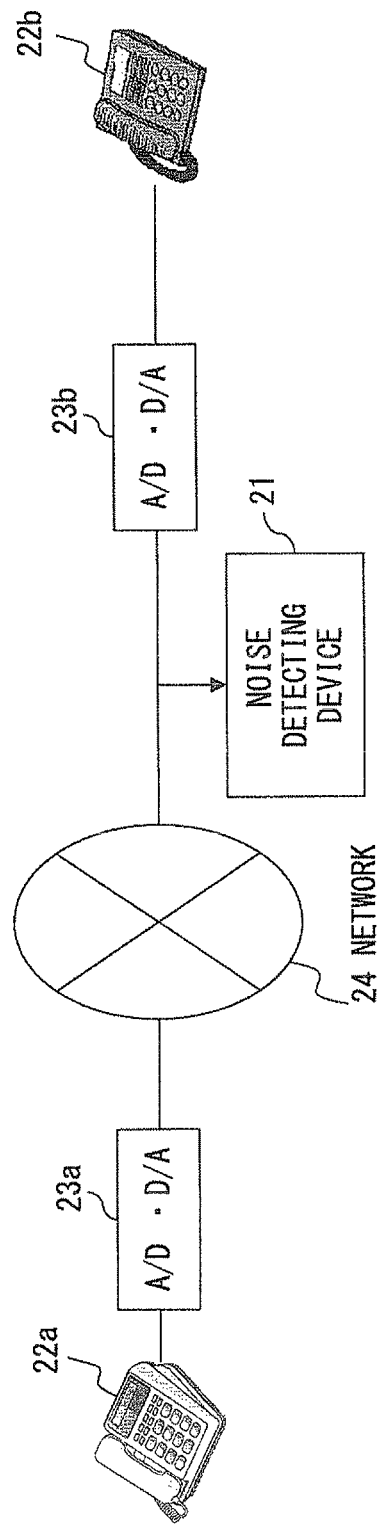
FIG. 6 illustrates a voice communication network.

Preferred embodiments according to the present invention are described below. FIG. 6 illustrates a voice communication network. A voice signal in a telephone band, which is input from a telephone 22a, is sampled by an A/D·D/A converter 23a at a predetermined frequency, converted into a digital voice signal, and transmitted to a network 24. A noise detecting device 21 on a receiving side detects an impulsive noise of the digital voice signal. The impulsive noise detected by the noise detecting device 21 may be removed by a noise removing device included in the noise detecting device 21, or an external noise removing device. Moreover, an occurrence of the impulsive noise may be notified to a network administrator, etc. An A/D·D/A converter 23b converts the digital voice signal into an analog voice signal, and outputs the converted signal to a telephone 22b.

Figure 7:
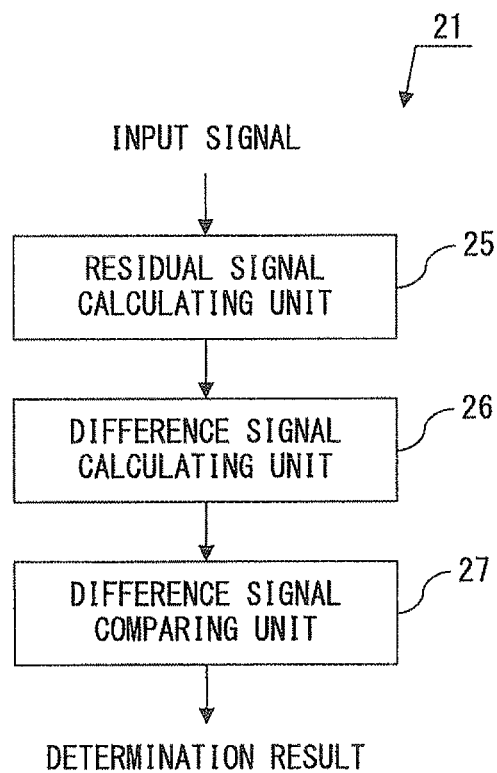
FIG. 7 is a block diagram of a noise detecting device according to an embodiment.

FIG. 7 is a block diagram of a noise detecting device 21 according to an embodiment. The noise detecting device 21 includes a residual signal calculating unit 25, a difference signal calculating unit 26, and a difference signal comparing unit 27.

The residual signal calculating unit 25 calculates a residual signal by removing a prediction signal, which is obtained by performing a linear prediction for an input signal, from the input signal input via the voice signal communication network. The difference signal calculating unit 26 calculates a difference between the amplitudes of a residual signal at each sample timing and the residual signal at the preceding sample timing.

The difference signal comparing unit (corresponding to a determining unit) 27 determines whether or not an impulsive noise is present based on a difference signal at the current sample timing, and a difference signal at each sample timing within a predetermined duration from the current sample timing. The difference signal comparing unit 27 obtains, for example, the maximum value of the amplitudes of difference signals at respective sample timings within the predetermined duration, and calculates the ratio of the amplitude value of the difference signal at the current sample timing to the maximum value of the amplitudes of difference signals within the predetermined duration. Then, the difference signal comparing unit 27 determines the presence of the impulsive noise if the calculated ratio is equal to or larger than a threshold value.

Figure 8:
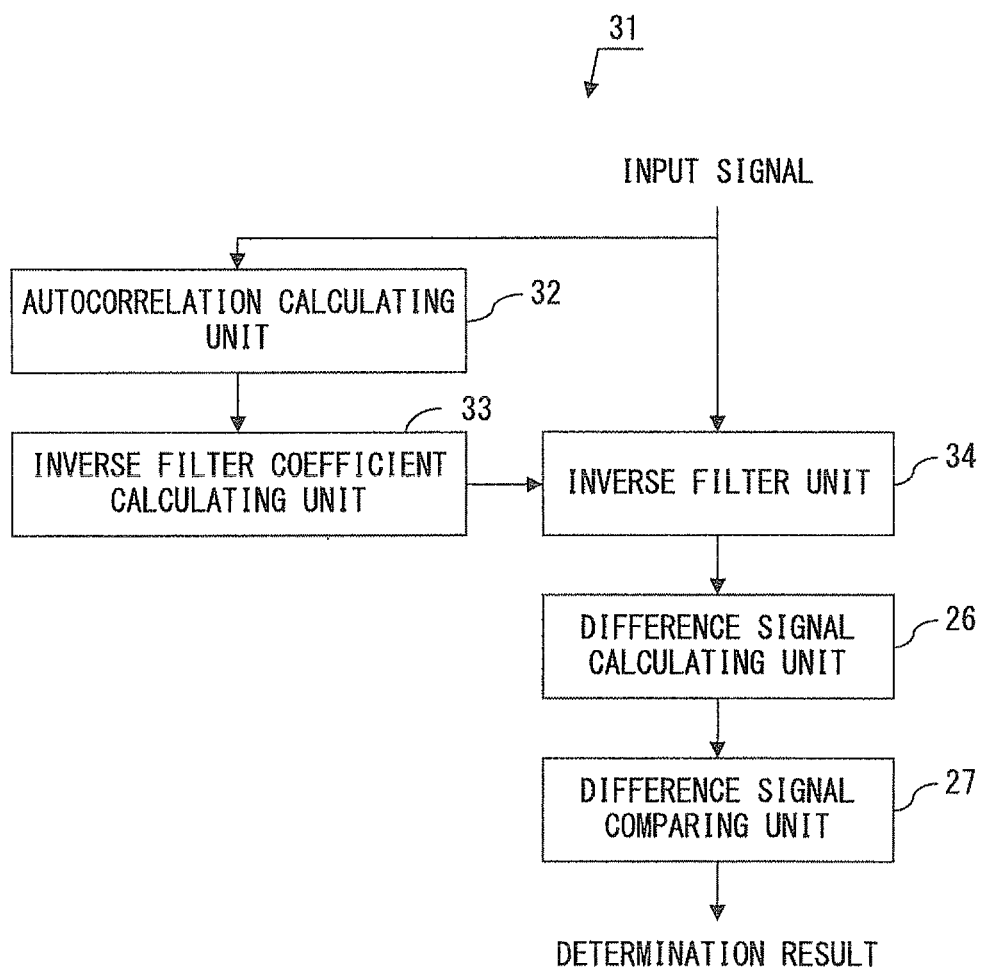
FIG. 8 is a block diagram of a noise detecting device according to a first embodiment.

FIG. 8 is a block diagram of a noise detecting device 31 according to a first embodiment. This figure illustrates a specific example of the residual signal calculating unit 25 illustrated in FIG. 7.

The residual signal calculating unit 25 includes an autocorrelation calculating unit 32, an inverse filter coefficient calculating unit 33, and an inverse filter unit 34.

The autocorrelation calculating unit 32 obtains the autocorrelation function of an input signal in accordance with the following equation.

$$ac(i) = \sum_{n=i}^{N-1} x(n) \cdot x(n-1) \ (0 \le i \le p)$$

where ac(i), N, and p represent the autocorrelation function, a frame length, and the order of the autocorrelation function, respectively. For example, if the sampling frequency is 8 kHz, values such as N=160, p=10, etc. are used.

The inverse filter coefficient calculating unit 33 calculates an inverse filter coefficient α(i) from the autocorrelation function ac(i) by using a known method such as a Levinson algorithm, etc.

The inverse filter unit 34 executes an inverse filter process for an input signal, and calculates a residual signal r(n).

$$r(n) = x(n) - \sum_{i=1}^{p} \alpha_1(i) x(n-1) \ (0 \le n < N)$$

The difference signal calculating unit 26 obtains a difference signal d(n) by calculating the difference between the amplitudes of the residual signals r(n) at the current sample timing and r(n−1) at the sample timing preceding the current sample timing, which are output from the inverse filter unit 34, in accordance with the following equation.

$$d(n) = r(n) - r(n-1) \ (0 \le n < N)$$

Not the signal at the preceding sample timing but the value with which the amplitude difference becomes maximum in M samples may be recognized as the difference signal. Moreover, the residual signal calculating method is not limited to the above described one using the autocorrelation function, and other methods may be available.

FIG. 9 is a flowchart illustrating the operations of the difference signal comparing unit 27 in the noise detecting device 31 according to the first embodiment.

The difference signal comparing unit 27 searches for the maximum value of difference signals in K samples before and after the current sample timing (S11).

Next, the ratio of the amplitude difference (difference signal) at the current sample timing to the amplitude of the difference signal having the maximum amplitude in the K samples before and after the current sample timing is calculated (S12). Then, it is determined whether or not the ratio of the difference signal at the current sample timing to the maximum value of the amplitudes of the difference signals in the K samples is equal to or larger than a predetermined threshold value (S13).

If the ratio of the amplitude of the difference signal at the current sample timing to the maximum value of the amplitudes in the K samples before and after the current sample timing is equal to or larger than the threshold value ("YES" in S13), the process goes to step S14, in which the presence of an impulsive noise is determined.

In contrast, if the ratio of the amplitude of the difference signal at the current sample timing to the amplitude of the difference signal having the maximum amplitude in the K samples before and after the current sample timing is smaller than the threshold value ("NO" in step S13), the process goes to step S15, in which the absence of the impulsive noise is determined. The number of samples K and the threshold value are, for example, 100 and 2 respectively at the sampling frequency of 8 kHz.

FIG. 10A illustrates a 1-kHz tone signal on which an impulsive noise is superimposed, and FIG. 10B illustrates its residual signal. FIG. 10C illustrates a residual signal of another voice signal on which a noise is superimposed.

In the portion where the impulsive noise is superimposed, an error of linear prediction becomes large. Therefore, the amplitude value of the residual signal significantly changes as illustrated in FIG. 10B.

Making a comparison between the amplitudes of the residual signals illustrated in FIGS. 10B and 10C, the absolute value of the amplitude illustrated in FIG. 10C is larger. However, the signal illustrated in FIG. 10C is not recognized as an impulsive noise by a person although the signal illustrated in FIG. 10B is recognized as an impulsive noise.

This is because a difference from the preceding or the succeeding amplitude value or a ratio of amplitude values rather than the absolute value of the amplitude is expected to exert an influence on an impulsive noise.

Accordingly, the impulsive noise that is sensed as an auditory noise can be detected by determining whether or not the ratio of the amplitude of the difference signal at the current sample timing to those of difference signals within a predetermined duration is equal to or larger than a predetermined value.

According to the above described first embodiment, the maximum value of difference signals in the K samples (within a predetermined duration) before and after the current sample timing is searched, and the ratio of the amplitude of the difference signal at the current sample timing to the searched maximum value of the amplitudes of the difference signals is calculated. Then, whether or not an impulsive noise is present is determined by judging whether or not the calculated ratio is equal to or larger than a threshold value. As a result, the impulsive noise grating on a person's ear can be detected.

In the first embodiment, it is determined whether or not the ratio of the amplitude of the difference signal at the current sample timing to the maximum value of the amplitudes of the difference signals within a predetermined duration is equal to or larger than the threshold value. However, it may be determined whether or not the ratio of the current sample to each difference signal within a predetermined duration is equal to or larger than a threshold value.

Figure 11:
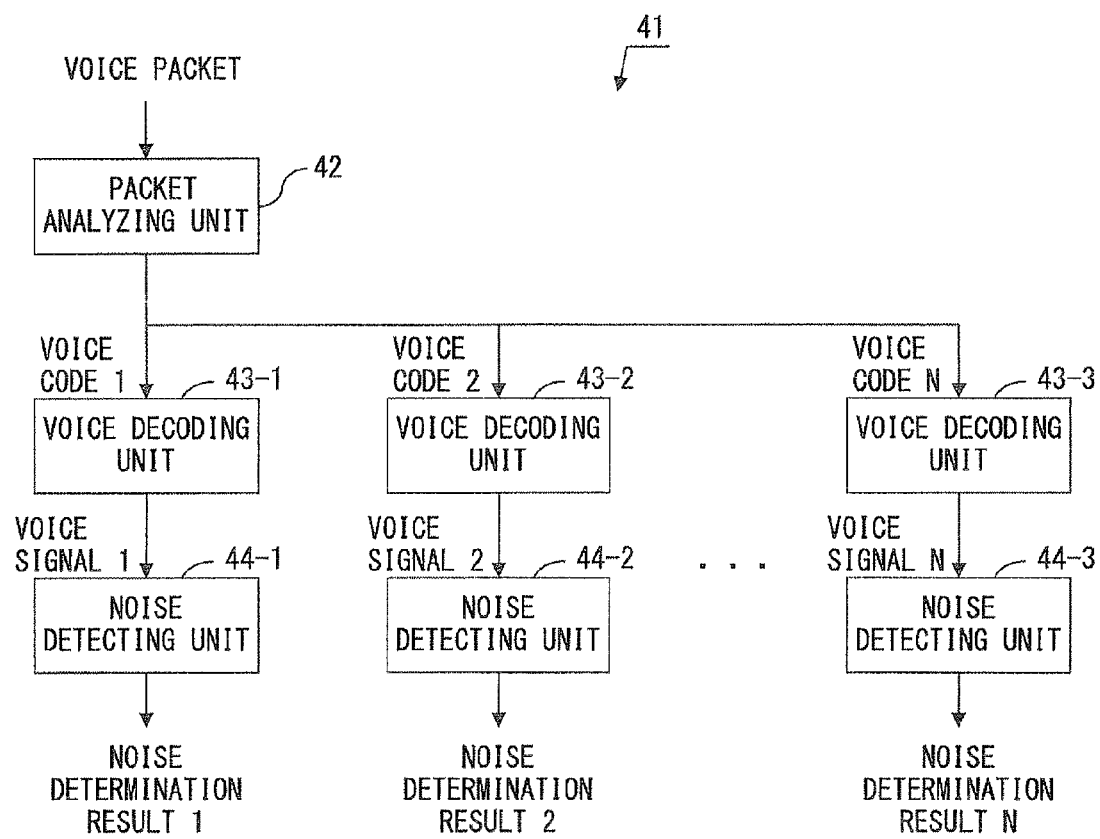
FIG. 11 illustrates one example of a device including the noise detecting device.

FIG. 11 illustrates one example of a device 41 including the noise detecting device 31 according to the first embodiment.

In FIG. 11, a packet analyzing unit 42 distributes a packet to each communication destination after analyzing the header of the voice packet received from a network. Voice decoding units 43-1 to 43-$n$ decode encoded voice data. Noise detecting units (each corresponding to the noise detecting device) 44-1 to 44-$n$ detect an impulsive noise of a digital voice signal, and output a noise determination result.

Figure 12:
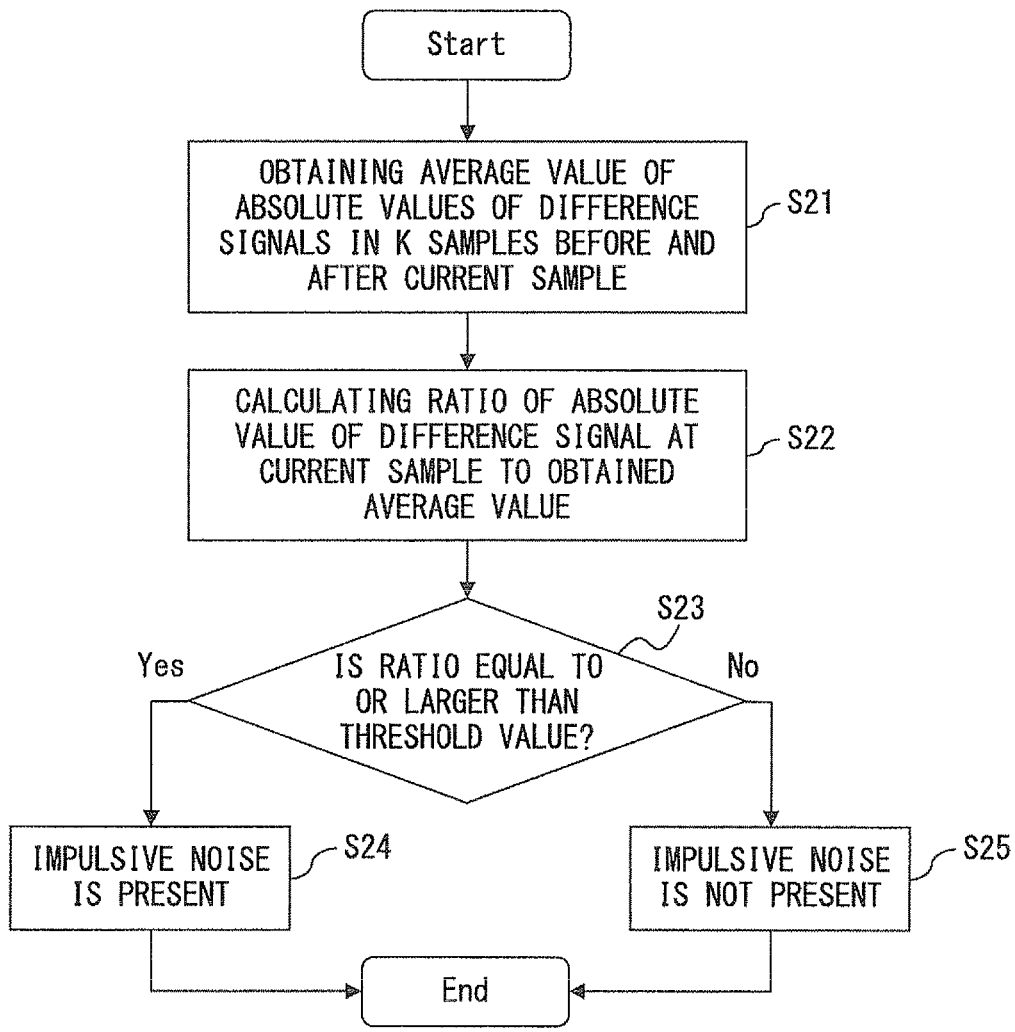
FIG. 12 is a flowchart illustrating the operations of a second embodiment.

FIG. 12 is a flowchart illustrating the operations of the difference signal comparing unit 27 of the noise detecting device 21 according to the second embodiment.

Configurations of noise detecting devices according to the embodiments to be described later are identical to the noise detecting device 31 according to the first embodiment illustrated in FIG. 8.

According to the second embodiment, whether or not an impulsive noise is present is determined by using a ratio of a difference signal at the current sample timing to the average value of difference signals within predetermined durations before and after the current sample timing.

The difference signal comparing unit 27 calculates the average value of the absolute values of the amplitudes of difference signals in the K samples before and after the current sample timing (S21). Next, the ratio of the absolute value of the amplitude of the difference signal at the current sample timing to the average value of the amplitudes of the difference signals in the K samples before and after the current sample timing is calculated (S22).

Next, it is determined whether or not the ratio of the difference signal at the current sample to the average value of the amplitudes of difference signals in the K samples before and after the current sample is equal to or larger than a threshold value (S23).

If the ratio of the current sample to the average value is equal to or larger than the threshold value ("YES" in step S23), the process goes to step S24, in which the presence of an impulsive noise is determined.

In contrast, if the ratio of the current sample to the average value is smaller than the threshold value ("NO" in step S23), the process goes to step S25, in which the absence of the impulsive noise is determined.

According to the above described second embodiment, an impulsive noise can be detected by determining whether or not the ratio of the absolute value of the amplitude of the difference signal at the current sample timing to the average value of the absolute values of the amplitudes of the difference signals within a predetermined duration before and after the current sample timing is equal to or larger than a threshold value.

Figure 13:
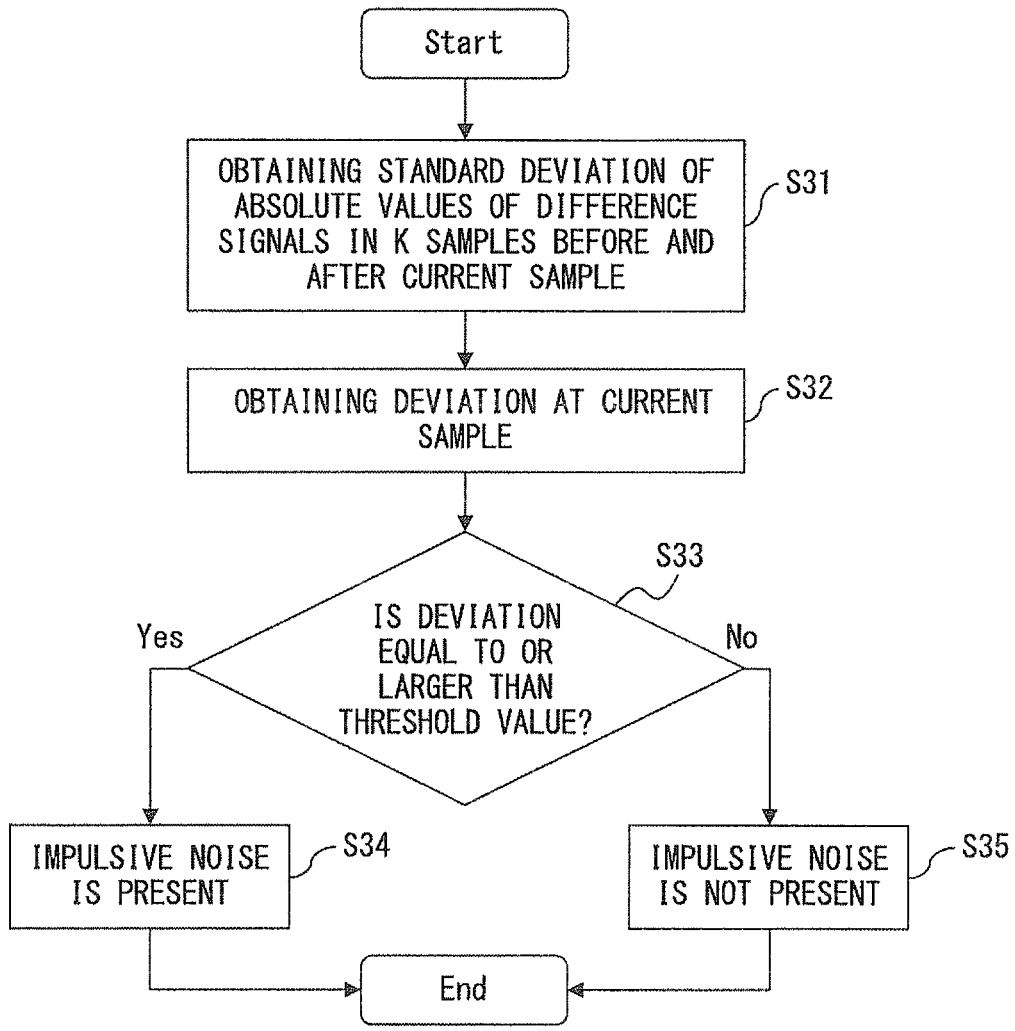
FIG. 13 is a flowchart illustrating the operations of a third embodiment.

FIG. 13 is a flowchart illustrating the operations of the difference signal comparing unit 27 of the noise detecting device 31 according to the third embodiment.

According to the third embodiment, a standard deviation of difference signals within a predetermined duration before and after the current sample is calculated, and whether or not an impulsive noise is present is determined by calculating a deviation of the difference signal at the current sample from the standard deviation.

After the residual signals and the difference signals at the current sample and K samples before and after the current sample are calculated, the standard deviation of the absolute values of difference signals in the K samples before and after the current sample is calculated (S31).

Here, the standard deviation is described with reference to FIG. 14. Assume that an amplitude value at an arbitrary sample point, and the number of samples are $d_n$, and –K to K respectively. In this case, an average value $d_{av}$ can be represented with the equation (1) illustrated in FIG. 14.

The standard deviation S can be obtained with the equation (2) illustrated in FIG. 14 if the absolute value and the average value of an amplitude at an arbitrary sample point, and the number of samples are assumed to be $d_n$, $d_{av}$, and 2K respectively. Moreover, a deviation $H_0$ in the case of n=0 can be obtained with the equation (3) of FIG. 14 when the standard deviation S is acquired.

Accordingly, the deviation of the difference signal at the current sample timing can be calculated with the equations (1) to (3) illustrated in FIG. 14.

According to the above described third embodiment, whether or not an impulsive noise is present can be determined by judging whether or not the deviation of the difference signal at the current sample is equal to or larger than a threshold value, namely, whether or not a difference between the deviation of the difference signal of the current sample and the standard deviation of difference signals within a predetermined duration is equal to or larger than the threshold value.

Figure 15:
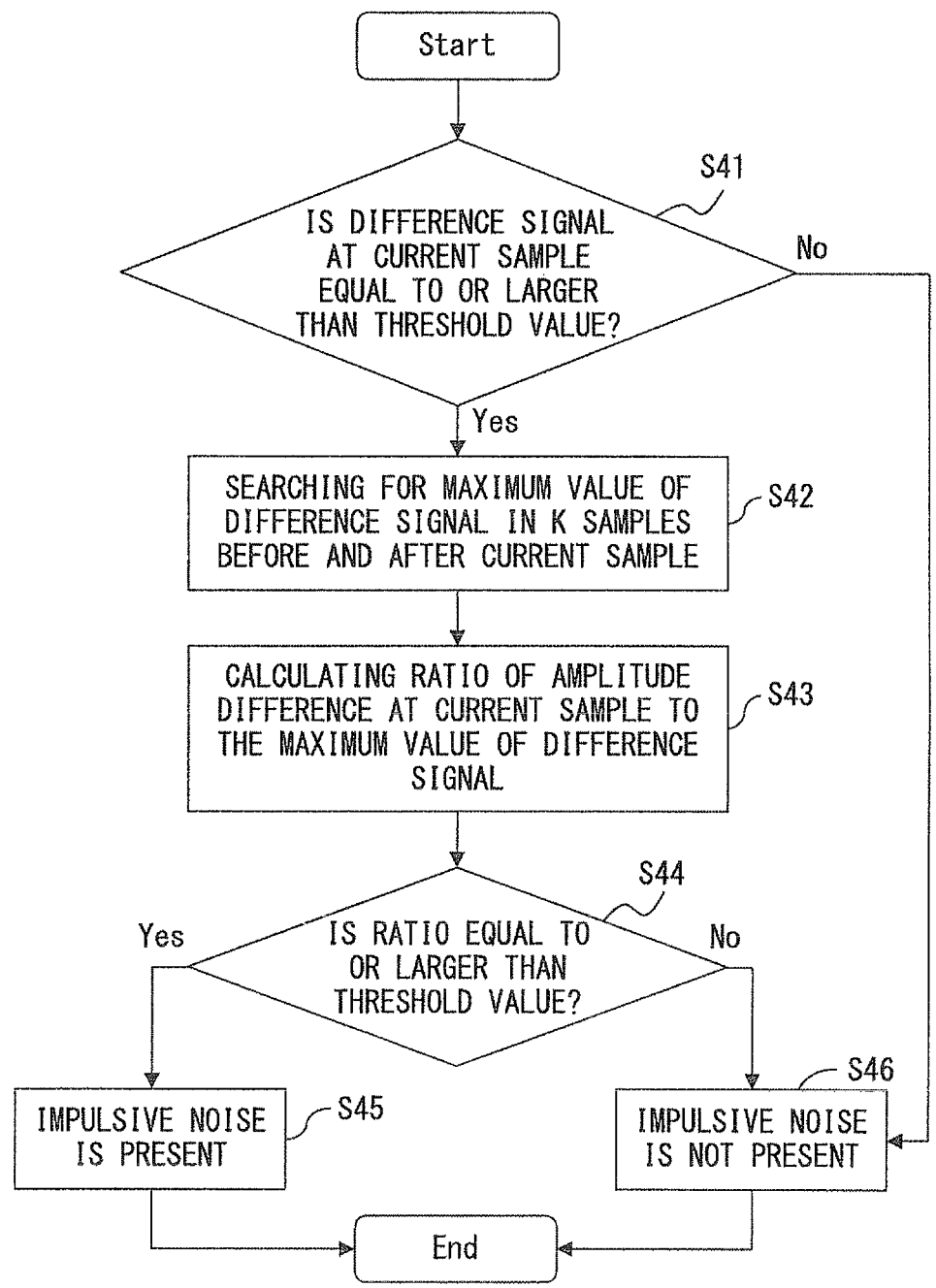
FIG. 15 is a flowchart illustrating the operations of a fourth embodiment.

FIG. 15 is a flowchart illustrating the operations of the difference signal comparing unit 27 of the noise detecting device 31 according to the fourth embodiment.

According to the fourth embodiment, it is determined whether or not the amplitude of the difference signal at the current sample timing is equal to or larger than a first threshold value, and whether or not an impulsive noise is present is determined if the amplitude is equal to or larger than the first threshold value.

The difference signal comparing unit 27 determines whether or not the amplitude of the difference signal at the current sample is equal to or larger than the first threshold value (S41). If the amplitude of the difference signal at the current sample is equal to or larger than the first threshold value ("YES" in S41), the process goes to step S42, in which the maximum value of difference signals in the K samples before and after the current sample is searched.

Next, the ratio of the difference signal at the current sample to the maximum value of the amplitudes of difference signals in the K samples before and after the current sample is calculated (S43).

Then, it is determined whether or not the ratio of the current sample to the maximum value in the K samples before and after the current sample is equal to or larger than a second threshold value (S44).

If the ratio of the current sample to the maximum value is equal to or larger than the second threshold value ("YES" in S44), the process goes to step S45, in which the presence of an impulsive noise is determined.

In contrast, if the ratio of the current sample to the maximum value is smaller than the second threshold value ("NO" in S44), the process goes to step S46, in which the absence of the impulsive noise is determined.

According to the above described fourth embodiment, whether or not an impulsive noise is present is determined only if the amplitude of the difference signal at the current sample is equal to or larger than the first threshold value, thereby reducing the processing time for determining an impulsive noise. Additionally, whether or not an impulsive noise is present can be determined only for a signal that can possibly have an impulsive noise.

Figure 16:
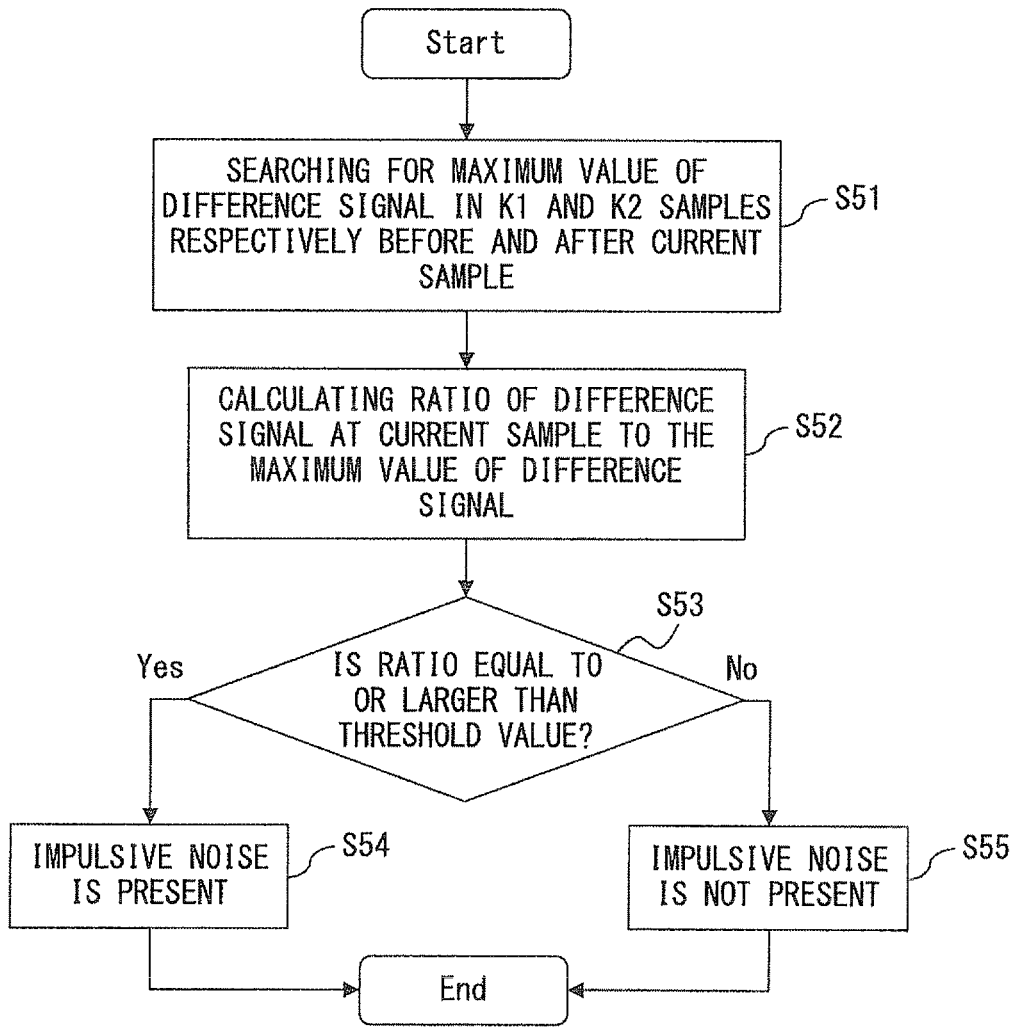
FIG. 16 is a flowchart illustrating the operations of a fifth embodiment.

FIG. 16 is a flowchart illustrating the operations of the difference signal comparing unit 27 of the noise detecting device 31 according to the fifth embodiment.

According to the fifth embodiment, durations before and after the current sample to be compared at the time of an impulsive noise determination are made different.

The difference signal comparing unit 27 searches for the maximum value of the amplitudes of difference signals in K1 and K2 samples respectively before and after the current sample (S51). If the maximum value can be obtained, the ratio of the amplitude of the difference signal at the current sample to the searched maximum value is calculated (S52). Then, it is determined whether or not the ratio of the difference signal at the current sample to the maximum value of difference signals in the K1 and the K2 samples respectively before and after the current sample is equal to or larger than a threshold value (S53).

If the ratio of the current sample to the maximum value in the K1 and the K2 samples respectively before and after the current sample is equal to or lager than the threshold value ("YES" in S53), the process goes to step S54, in which the presence of an impulsive noise is determined.

In contrast, if the ratio of the current sample to the maximum value in the K1 and the K2 samples respectively before and after the current sample is smaller than the threshold value ("NO" in S53), the absence of an impulsive noise is determined.

According to the above described fifth embodiment, by making the durations before and after the current sample timing different, suitable durations before and after the current sample can be set as durations to be compared even if an impulsive noise continues for a predetermined length of time. As a result, an impulsive noise of an arbitrary waveform can be accurately detected.

FIG. 17 is a flowchart illustrating the operations of the difference signal comparing unit 27 of the noise detecting device 31 according to the sixth embodiment.

According to the sixth embodiment, a subsequent duration from which a predetermined duration after the current sample is removed is recognized as a duration to be compared.

The maximum value of difference signals in K1 samples before the current sample timing and in K2 samples after X samples from the current sample timing is searched (S61).

The process of step S61 is intended to remove a duration including an impulsive noise from a duration to be compared, for example, when the waveform of the impulsive noise or an envelope gradually changes. The determination accuracy of an impulsive noise can be improved by removing the duration of a predetermined number of samples X after the current sample from the duration to be compared of the difference signal at the current sample.

Next, the ratio of the difference signal at the current sample to the searched maximum value is calculated (S62). Next, it is determined whether or not the calculated ratio is equal to or larger than a threshold value (S63).

If the ratio of the current sample to the maximum value of difference signals within predetermined durations before and after the current sample is equal to or larger than the threshold value ("YES" in S63), the process goes to step S64, in which the presence of an impulsive noise is determined.

In contrast, if the ratio of the current sample to the maximum value of the difference signals within the predetermined durations before and after the current sample is smaller than the threshold value ("NO" in S63), the process goes to step S65, in which the absence of the impulsive noise is determined.

According to the above described sixth embodiment, a duration from which a predetermined duration (X samples) after the current sample is removed is set as a duration to be compared, whereby a duration during which an impulsive noise exists can be removed, for example, when the envelope of the impulsive noise gradually changes. As a result, the impulsive noise can be detected more accurately. In the sixth embodiment, a predetermined duration after the current sample is removed from a duration to be compared. However, a predetermined duration before the current sample may be removed, or both of predetermined durations before and after the current sample may be removed.

With the disclosed noise detecting devices, an impulsive noise of a digital voice signal can be accurately detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A noise detecting device for detecting an impulsive noise of a digital voice signal, the noise detecting device comprising:
   a residual signal calculating unit configured to calculate a residual signal that is obtained by removing a prediction signal, which is acquired by performing a linear prediction for an input digital voice signal, from the input digital voice signal;
   a difference signal calculating unit configured to calculate a first difference signal that indicates an amplitude difference between a residual signal at a current sample timing and a residual signal at any sample timing before the current sample timing; and
   a determining unit configured to determine whether or not an impulsive noise is present on the basis of an amplitude of the first difference signal at the current sample timing, and an amplitude of a second difference signal, the second difference signal indicating an amplitude difference between a residual signal at a sample timing within a predetermined duration before or after the current sample timing and a residual signal at any sample timing before the sample timing within the predetermined duration, wherein
   the residual signal calculating unit includes
      an autocorrelation calculating unit configured to calculate an autocorrelation function of the input digital voice signal;
      an inverse filter coefficient calculating unit configured to calculate an inverse filter coefficient from the autocorrelation function; and
      an inverse filter unit configured to execute an inverse filter process for the input digital voice signal by using the inverse filter coefficient, and to calculate the residual signal, and
   the determining unit calculates a ratio of an absolute value of the amplitude of the first difference signal at the current sample timing to an amplitude of the second difference signal having a maximum absolute value of an amplitude among difference signals within the predetermined duration before and after the current sample timing, and determines whether or not an impulsive noise is present by judging whether or not the ratio of the amplitudes is equal to or larger than a threshold value.

2. The noise detecting device according to claim 1, wherein the determining unit determines whether or not an impulsive noise is present when an absolute value of the amplitude of the first difference signal at the current sample timing is equal to or larger than a predetermined value.

3. The noise detecting device according to claim 1, wherein the determining unit determines whether or not an impulsive noise is present by using a signal, which has a maximum difference from the residual signal at the current sample timing, among residual signals at a plurality of sample timings before the current sample timing by a predetermined duration, for a calculation of the first difference signal.

4. The noise detecting device according to claim 1, wherein the determining unit does not recognize a difference signal for a particular duration before or after the current sample timing as a comparison target.

5. The noise detecting device according to claim 1, wherein the determining unit makes predetermined durations before and after the current sample timing different.

6. A noise detecting device for detecting an impulsive noise of a digital voice signal, the noise detecting device comprising:
   a residual signal calculating unit configured to calculate a residual signal that is obtained by removing a prediction signal, which is acquired by performing a linear prediction for an input digital voice signal, from the input digital voice signal;
   a difference signal calculating unit configured to calculate a first difference signal that indicates an amplitude difference between a residual signal at a current sample timing and a residual signal at any sample timing before the current sample timing; and
   a determining unit configured to determine whether or not an impulsive noise is present on the basis of an amplitude of the first difference signal at the current sample timing, and an amplitude of a second difference signal, the second difference signal indicating an amplitude difference between a residual signal at a sample timing within a predetermined duration before or after the current sample timing and a residual signal at any sample timing before the sample timing within the predetermined duration, wherein
   the residual signal calculating unit includes
      an autocorrelation calculating unit configured to calculate an autocorrelation function of the input digital voice signal;
      an inverse filter coefficient calculating unit configured to calculate an inverse filter coefficient from the autocorrelation function; and
      an inverse filter unit configured to execute an inverse filter process for the input digital voice signal by using the inverse filter coefficient, and to calculate the residual signal, and
   the determining unit calculates a ratio of a first absolute value of the amplitude of the first difference signal at the current sample timing to a second absolute value of the amplitude of the second difference signal, the second absolute value indicating an average value of absolute values of amplitudes of difference signals within the predetermined duration before and after the current sample timing, and determines whether or not an impulsive noise is present by judging whether or not the ratio of the amplitudes is equal to or larger than a threshold value.

7. The noise detecting device according to claim 6, wherein the determining unit determines whether or not an impulsive noise is present when an absolute value of the amplitude of the first difference signal at the current sample timing is equal to or larger than a predetermined value.

8. The noise detecting device according to claim 6, wherein the determining unit determines whether or not an impulsive noise is present by using a signal, which has a maximum difference from the residual signal at the current sample timing, among residual signals at a plurality of sample timings before the current sample timing by a predetermined duration, for a calculation of the first difference signal.

9. The noise detecting device according to claim 6, wherein the determining unit does not recognize a difference signal for a particular duration before or after the current sample timing as a comparison target.

10. A noise detecting method for detecting an impulsive noise of a digital voice signal, the noise detecting method comprising:
    calculating a residual signal that is obtained by removing a prediction signal, which is acquired by performing a linear prediction for an input digital voice signal, from the input signal;
    calculating a first difference signal that indicates an amplitude difference between a residual signal at a current sample timing and a residual signal at any sample timing before the current sample timing; and
    determining presence/absence of an impulsive noise on the basis of an amplitude of the first difference signal at the current sample timing, and an amplitude of a second difference signal, the second difference signal indicating an amplitude difference between a residual signal at a sample timing within a predetermined duration before or after the current sample timing and a residual signal at any sample timing before the sample timing within the predetermined duration,
    wherein the determining calculates a ratio of an absolute value of the amplitude of the first difference signal at the current sample timing to an amplitude of the second difference signal having a maximum absolute value of an amplitude among difference signals within the predetermined duration before and after the current sample timing, and determines whether or not an impulsive noise is present by judging whether or not the ratio of the amplitudes is equal to or larger than a threshold value.

11. A noise detecting method for detecting an impulsive noise of a digital voice signal, the noise detecting method comprising:
    calculating a residual signal that is obtained by removing a prediction signal, which is acquired by performing a linear prediction for an input digital voice signal, from the input signal;
    calculating a first difference signal that indicates an amplitude difference between a residual signal at a current sample timing and a residual signal at any sample timing before the current sample timing; and
    determining presence/absence of an impulsive noise on the basis of an amplitude of the first difference signal at the current sample timing, and an amplitude of a second difference signal, the second difference signal indicating an amplitude difference between a residual signal at a sample timing within a predetermined duration before or after the current sample timing and a residual signal at any sample timing before the sample timing within the predetermined duration,
    wherein the determining calculates a ratio of a first absolute value of the amplitude of the first difference signal at the current sample timing to a second absolute value of the amplitude of the second difference signal, the second absolute value indicating an average value of absolute values of amplitudes of difference signals within the predetermined duration before and after the current sample timing, and determines whether or not an impulsive noise is present by judging whether or not the ratio of the amplitudes is equal to or larger than a threshold value.

* * * * *